United States Patent [19]

Pedrazzi

[11] Patent Number: 4,875,903
[45] Date of Patent: Oct. 24, 1989

[54] MONOAZO COMPOUNDS CONTAINING A 2-SULFOPHENYL DIAZO COMPONENT RADICAL AND A 1-HYDROXY-NAPHTHALENE-SULFONIC OR DISULFONIC ACID COUPLING COMPONENT RADICAL AND TWO SUBSTITUTED 1,3,5-TRIAZINE RINGS

[75] Inventor: Reinhard Pedrazzi, Allschwil, Switzerland

[73] Assignee: Sandoz Ltd., Basel, Switzerland

[21] Appl. No.: 58,434

[22] Filed: Jun. 5, 1987

[30] Foreign Application Priority Data

Jun. 7, 1986 [DE] Fed. Rep. of Germany ....... 3619198

[51] Int. Cl.$^4$ .................. C09B 29/01; C09B 29/036; C09B 29/20; C09B 29/22
[52] U.S. Cl. .......................................... 8/640; 8/549; 8/639; 8/641; 534/582; 534/605; 534/606; 534/617; 534/632; 534/638; 534/803; 534/806; 534/808; 534/809; 534/810; 162/162
[58] Field of Search ............... 534/606, 605, 803, 806, 534/808, 809, 810, 617, 632, 638; 8/549, 639, 640, 641

[56] References Cited

U.S. PATENT DOCUMENTS

| 4,363,761 | 12/1982 | Pedrazzi | 534/803 |
| 4,367,172 | 1/1983 | Pedrazzi | 534/803 X |
| 4,521,217 | 6/1985 | Beck et al. | 8/639 |
| 4,544,737 | 10/1985 | Stohr et al. | 534/605 |
| 4,594,410 | 6/1986 | Pedrazzi | 534/605 X |
| 4,686,285 | 8/1987 | Pedrazzi | 534/606 |

FOREIGN PATENT DOCUMENTS

| 3133568 | 3/1983 | Fed. Rep. of Germany | 534/605 |
| 3224786 | 1/1984 | Fed. Rep. of Germany | 534/605 |
| 2082615 | 3/1982 | United Kingdom | 534/606 |

Primary Examiner—Floyd D. Higel
Attorney, Agent, or Firm—Gerald D. Sharkin; Richard E. Vila; Melvyn M. Kassenoff

[57] ABSTRACT

Compounds of the formula

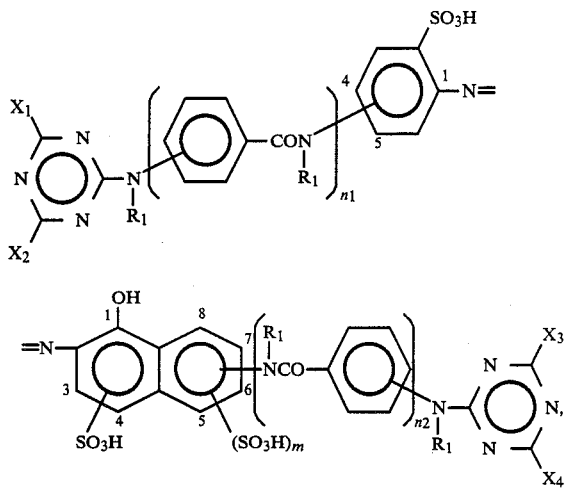

wherein
each $R_1$ is independently hydrogen, $C_{1-4}$alkyl or $C_{1-4}$alkyl monosubstituted by hydroxy, halo, cyano or $C_{1-4}$alkoxy,
each of $X_1$ and $X_3$ is independently halo, hydroxy, $C_{1-4}$alkyl, $C_{1-4}$alkoxy, phenyl, phenoxy, amino or an aliphatic, cycloaliphatic, aromatic or heterocyclic amino group,
each of $X_2$ and $X_4$ is independently an aliphatic, cycloaliphatic, aromatic or heterocyclic amino group containing at least one protonatable nitrogen atom or quaternary ammonium group,
m is 0 or 1, and
each of $n_1$ and $n_2$ is independently 0 or 1, with the proviso that $n_1+n_2$ is 1 or 2,
wherein each halo is independently fluoro, chloro or bromo, with the provisos that (1) the total number of basic and cationic groups present as $X_1-X_4$ equals or exceeds the number of sulfo groups, (2) the hydroxy or alkoxy group of each hydroxy- or alkoxy-substituted alkyl group or alkylene radical attached to a nitrogen atom is bound to a carbon atom other than the $C_1$-atom, and (3) the hydroxy groups of each alkylene radical substituted by two hydroxy groups are attached to different carbon atoms, mixtures of such compounds and salts and mixtures with one or more copper phthalocyanine dyes containing basic and/or cationic groups, are suitable for dyeing or printing hydroxy group- or nitrogen- containing organic substrates as such or in form of solid or liquid aqueous dye preparations. They are also suitable for dyeing glass and products thereof and the preparation of inks.

19 Claims, No Drawings

MONOAZO COMPOUNDS CONTAINING A 2-SULFOPHENYL DIAZO COMPONENT RADICAL AND A 1-HYDROXY-NAPHTHALENE-SULFONIC OR DISULFONIC ACID COUPLING COMPONENT RADICAL AND TWO SUBSTITUTED 1,3,5-TRIAZINE RINGS

The invention relates to monoazo compounds containing triazinyl groups which compounds have sulphonic acid groups in addition to basic groups. These compounds are suitable for use in dyeing or printing processes.

More particularly, this invention provides compounds of formula I,

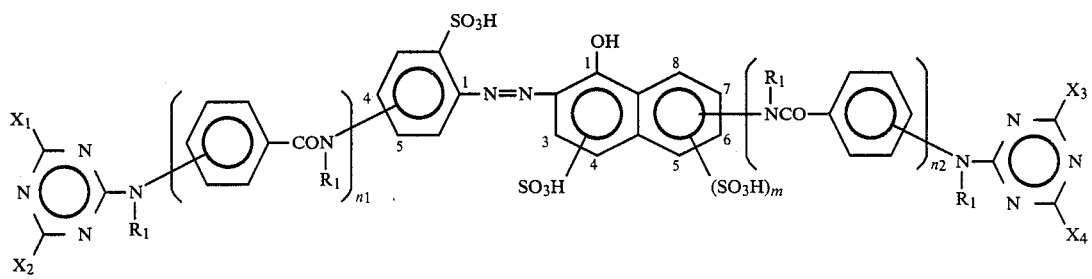

in which
m is 0 or 1,
each $n_1$ and $n_2$ is independently 0 or 1 provided that $n_1+n_2$ is 1 or 2,
each $R_1$ is independently hydrogen, unsubstituted $C_{1-4}$alkyl or $C_{1-4}$alkyl monosubstituted by hydroxy, halogen, cyano or $C_{1-4}$alkoxy,
each of $X_1$ and $X_3$ is independently halogen, hydroxy, amino, $C_{1-4}$alkyl, $C_{1-4}$alkoxy, phenyl, phenoxy, or an aliphatic, cycloaliphatic, aromatic or heterocyclic amino group, which amino group may contain protonatable nitrogen atoms or quaternary ammonium groups, and
each of $X_2$ and $X_4$ is independently an aliphatic, cycloaliphatic, aromatic or heterocyclic amino group, which amino group contains protonatable nitrogen atoms or quaternary ammonium groups, and mixtures of compounds of formula I, which compounds may be in internal or external salt form.

Any halogen is fluorine, chlorine or bromine, more preferably chlorine or bromine, especially chlorine.

Any alkyl or alkylene present is linear or branched unless indicated to the contrary.

In any hydroxy- or alkoxy-substituted alkyl or alkylene group which is linked to nitrogen, the hydroxy or alkoxy group is bound to a carbon atom other than to the $C_1$-atom. In any alkylene group substituted by two hydroxy groups the hydroxy groups are bound to different carbon atoms.

m is preferably 1.

Preferably one of $n_1$ and $n_2$ is 1 and the other is 0; more preferably $n_2$ is 1.

In the naphthol group the preferred positions for the sulpho group(s) and amino- or amido-group are as follows:

(a) $m=0$ $n_2=0$
the sulpho group is preferably in the 3-position with the amino group in the 5-, 6- or 7-position, more preferably the 6-position.

(b) $m=1$ $n_2=0$ or 1
the sulpho groups are preferably in the 3,6- or 4,6-positions with the amino- or amido-group in the 8-position; more preferably the sulpho groups are in the 3,6-positions.

The triazinylamino group directly bound to the phenyl ring of the diazo component or via the bridge member is preferably bound in the 4- or 5-position, more preferably in the 4-position.

Any alkyl as $R_1$ preferably contains 1 or 2 carbon atoms; more preferably it is methyl. Any substituted alkyl as $R_1$ is preferably $C_{1-3}$alkyl which is preferably monosubstituted by hydroxy, chlorine, cyano or methoxy, particularly by hydroxy.

Each $R_1$ is preferably $R_{1a}$, where each $R_{1a}$ is independently hydrogen, methyl, ethyl, hydroxy-$C_{2-3}$alkyl or methoxy-$C_{2-3}$alkyl. More preferably it is $R_{1b}$, where each $R_{1b}$ is independently hydrogen, methyl or 2-hydroxyethyl; most preferably each $R_1$ is hydrogen.

Any aliphatic amino group as $X_1$ or $X_3$ is preferably a mono($C_{1-4}$alkyl)-or di($C_{1-4}$alkyl)-amino group in which each alkyl group is independently unsubstituted or monosubstituted by halogen (particularly chlorine or bromine), $C_{1-4}$alkoxy, phenyl or hydroxy, of which substituents hydroxy is the most preferred one. Any cycloaliphatic amino group as $X_1$ or $X_3$ is preferably a $C_{5-6}$cycloalkyl amino group in which the cycloalkyl group is unsubstituted or substituted by one or two $C_{1-2}$alkyl groups.

Any aromatic amino group as $X_1$ or $X_3$ is preferably a phenylamino group in which the phenyl ring is unsubstituted or substituted by one or two groups selected from halogen (more preferably chlorine), $C_{1-4}$alkyl, $C_{1-4}$alkoxy, hydroxy and phenoxy.

Any heterocyclic amino group as $X_1$ or $X_3$ is preferably a saturated 5- or 6-membered ring containing one or two hetero atoms (in addition to N a further N, O or S), which heterocyclic ring is unsubstituted or substituted by one or two $C_{1-4}$alkyl groups. More preferably it is a piperidino-, morpholino-, piperazino- or N-methylpiperazino-group.

Any aliphatic, cycloaliphatic, aromatic or heterocyclic amino group as any of $X_1$ to $X_4$ containing protonatable nitrogen atoms or quaternary ammonium groups is preferably a group Z, where each Z is independently

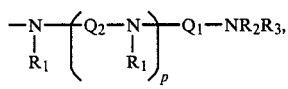

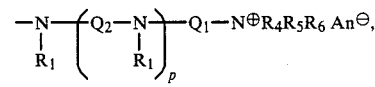

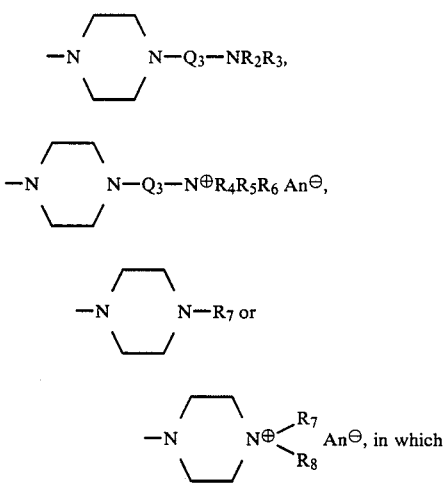

p is 0 or an integer 1 to 3,
each $R_1$ is as defined above,
each $R_2$ and $R_3$ is independently hydrogen, unsubstituted $C_{1-6}$alkyl, $C_{2-6}$alkyl monosubstituted by hydroxy or cyano, phenyl or phenyl-$C_{1-4}$alkyl, where the phenyl ring of the latter two groups is unsubstituted or substituted by one to three groups selected from chlorine, $C_{1-4}$alkyl and $C_{1-4}$alkoxy, unsubstituted $C_{5-6}$cycloalkyl or $C_{5-6}$cycloalkyl substituted by one to three $C_{1-4}$alkyl groups, or $R_2$ and $R_3$, together with the nitrogen atom to which they are attached, form a 5- or 6-membered ring containing one to three hetero atoms (in addition to N one or two further N, O or S), which heterocyclic ring is unsubstituted or substituted by one or two $C_{1-4}$alkyl groups,
each $R_4$ and $R_5$ has independently one of the non-cyclic or cyclic significances of $R_2$ and $R_3$ except hydrogen, and
$R_6$ is $C_{1-4}$alkyl or benzyl, or
$R_4$, $R_5$ and $R_6$, together with the nitrogen atom to which they are attached, form a pyridinium ring which is unsubstituted or substituted by one or two methyl groups,
$Q_1$ is $C_{2-8}$alkylene, $C_{3-6}$alkylene substituted by one or two hydroxy groups, $C_{1-6}$alkylene-1,3- or -1,4-phenylene, 1,3- or 1,4-phenylene, or —*NHCOCH$_2$—, where * denotes the atom bound to —NR$_1$—,
each $Q_2$ is independently $C_{2-8}$alkylene, $C_{3-6}$alkylene substituted by one or two hydroxy groups, $C_{1-6}$alkylene-1,3- or -1,4-phenylene or 1,3- or 1,4-phenylene,
$Q_3$ is $C_{2-8}$alkylene,
$R_7$ is hydrogen, unsubstituted $C_{1-6}$alkyl or $C_{1-6}$alkyl monosubstituted by hydroxy, cyano, chlorine or phenyl,
$R_8$ is unsubstituted $C_{1-6}$alkyl or $C_{1-6}$alkyl monosubstituted by hydroxy, cyano or chlorine, and
$An^{\ominus}$ is a non-chromophoric anion.

Any unsubstituted $C_{1-6}$alkyl group as $R_2$ or $R_3$ is preferably $C_{1-4}$alkyl, especially methyl or ethyl. Any substituted $C_{2-6}$alkyl group as $R_2$ or $R_3$ is preferably ethyl or propyl monosubstituted by cyano or hydroxy with the substituent in the 2- or 3-position.

Any phenyl as $R_2$ or $R_3$ is preferably unsubstituted. Any phenylalkyl group is preferably benzyl, the phenyl ring of which is preferably unsubstituted. Any cycloalkyl as $R_2$ or $R_3$ is preferably cyclohexyl; any alkylsubstituted cycloalkyl is preferably cyclohexyl substituted by one to three methyl groups.

When $R_2$ and $R_3$, together with the nitrogen to which they are attached, form a ring, this is preferably a pyrrolidino-, piperidino-, morpholino-, piperazino- or N-methylpiperazino-group.

$R_2$ and $R_3$ are preferably $R_{2a}$ and $R_{3a}$, where each $R_{2a}$ and $R_{3a}$ is independently hydrogen, unsubstituted $C_{1-6}$alkyl, linear hydroxy-$C_{2-3}$alkyl, phenyl or benzyl, or $R_{2a}$ and $R_{3a}$, together with the nitrogen to which they are attached, form a pyrrolidine-, piperidine-, morpholine-, piperazine- or N-methylpiperazine-ring.

More preferably, $R_2$ and $R_3$ are $R_{2b}$ and $R_{3b}$, where each $R_{2b}$ and $R_{3b}$ is independently hydrogen, unsubstituted $C_{1-4}$alkyl or 2-hydroxyethyl, or $R_{2b}$ and $R_{3b}$, together with the nitrogen to which they are attached, form a morpholine-, piperidine-, piperazine- or N-methylpiperazine-ring.

Most preferably, $R_2$ and $R_3$ are $R_{2c}$ and $R_{3c}$, where each $R_{2c}$ and $R_{3c}$ is independently hydrogen, methyl or ethyl.

It is particularly preferred that $R_2$ and $R_3$ having a non-cyclic significance are identical.

$R_4$ and $R_5$ are preferably $R_{4a}$ and $R_{5a}$, where each $R_{4a}$ and $R_{5a}$ is independently unsubstituted $C_{1-6}$alkyl, linear hydroxy-$C_{2-3}$alkyl or benzyl, or $R_{4a}$ and $R_{5a}$, together with the nitrogen to which they are attached, form a piperidine-, morpholine-, piperazine- or N-methylpiperazine-ring, or $R_{4a}$ and $R_{5a}$, together with $R_6$ and the nitrogen to which $R_{4a}$, $R_{5a}$, and $R_6$ are attached, form a pyridinium ring which is unsubstituted or substituted by one or two methyl groups.

More preferably, $R_4$ and $R_5$ are $R_{4b}$ and $R_{5b}$, where each $R_{4b}$ and $R_{5b}$ is independently unsubstituted $C_{1-4}$alkyl or 2-hydroxyethyl, or $R_{4b}$ and $R_{5b}$, together with $R_6$ and the nitrogen to which $R_{4b}$, $R_{5b}$ and $R_6$ are attached, form a pyridinium ring which is unsubstituted or monosubstituted by methyl.

Most preferably, $R_4$ and $R_5$ are $R_{4c}$ and $R_{5c}$, where each $R_{4c}$ and $R_{5c}$ is independently methyl or ethyl.

It is particularly preferred that $R_4$, $R_5$ and $R_6$ having a non-cyclic significance are identical groups.

Any alkyl as $R_6$ is preferably methyl or ethyl, especially methyl.

$R_6$ is preferably $R_{6a}$, where $R_{6a}$ is methyl, ethyl or benzyl, or $R_{6a}$ together with $R_{4a}$ and $R_{5a}$ and the nitrogen atom to which $R_{4a}$, $R_{5a}$ and $R_{6a}$ are attached forms a pyridinium ring which is unsubstituted or substituted by one or two methyl groups. More preferably, $R_6$ is $R_{6b}$, where $R_{6b}$ is methyl or together with $R_{4b}$ and $R_{5b}$ and the nitrogen to which $R_{4b}$, $R_{5b}$ and $R_{6b}$ are attached forms a pyridinium ring which is unsubstituted or monosubstituted by methyl.

Any alkylene as $Q_1$, $Q_2$ or $Q_3$ is preferably a $C_{2-6}$alkylene group. If it is a branched alkylene group it is preferably

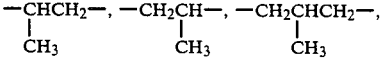

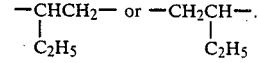

More preferably, it is a linear $C_{2-6}$alkylene group and especially an ethylene or n-propylene group. Most preferably each $Q_1$, $Q_2$ and $Q_3$ is a linear propylene group.

Any hydroxy-substituted $C_{3-6}$alkylene group as $Q_1$ or $Q_2$ is preferably a monohydroxy-substituted $C_{3-4}$alkylene group.

Any alkylene-phenylene group as $Q_1$ or $Q_2$ preferably contains 7 to 10 carbon atoms.

$Q_1$ is preferably $Q_{1a}$, where $Q_{1a}$ is —*NHCOCH$_2$—, unsubstituted $C_{2-6}$alkylene, monohydroxy-substituted $C_{3-4}$alkylene, -(CH$_2$)$_{1-4}$-1,3- or -1,4-phenylene, or 1,3- or 1,4-phenylene. More preferably $Q_1$ is $Q_{1b}$, where $Q_{1b}$ is unsubstituted $C_{2-6}$alkylene. Most preferably it is $Q_{1c}$, where $Q_{1c}$ is ethylene or 1,3-propylene, especially the latter.

Each $Q_2$ is preferably $Q_{2a}$, where each $Q_{2a}$ has independently one of the significances of $Q_{1a}$ except —*NHCOCH$_2$—. More preferably $Q_2$ is $Q_{2b}$, where each $Q_{2b}$ is independently a linear $C_{2-6}$alkylene group. Most preferably it is $Q_{2c}$, where each $Q_{2c}$ is ethylene or 1,3-propylene, and the $Q_{2c}$ groups are identical.

$Q_3$ is preferably $Q_{3a}$, where $Q_{3a}$ is unsubstituted $C_{2-6}$alkylene. More preferably it is $Q_{3b}$, where $Q_{3b}$ is a linear $C_{2-6}$alkylene group. Most preferably $Q_3$ is $Q_{3c}$, where $Q_{3c}$ is ethylene or 1,3-propylene.

Any unsubstituted alkyl group as $R_7$ or $R_8$ is preferably $C_{1-4}$alkyl, especially methyl or ethyl. Any substituted alkyl group as $R_7$ or $R_8$ is preferably a monohydroxy-substituted $C_{2-4}$alkyl group.

$R_7$ is preferably $R_{7a}$, where $R_{7a}$ is hydrogen, unsubstituted $C_{1-4}$alkyl or monohydroxy-substituted $C_{2-4}$alkyl. More preferably it is $R_{7b}$, where $R_{7b}$ is hydrogen, methyl, ethyl or 2-hydroxyethyl.

$R_8$ is preferably $R_{8a}$, where $R_{8a}$ is unsubstituted $C_{1-4}$alkyl or monohydroxy-substituted $C_{2-4}$alkyl. More preferably it is $R_{8b}$, where $R_{8b}$ is methyl, ethyl or 2-hydroxyethyl.

p is preferably 0 or 1, especially 0.

Z is preferably $Z_a$, where $Z_a$ is

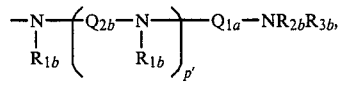

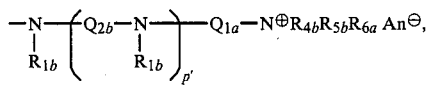

in which groups p' is 0 or 1,

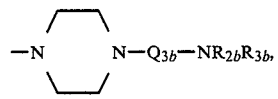

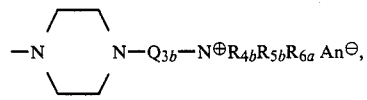

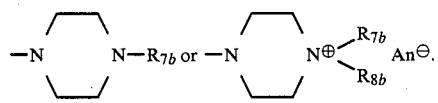

More preferably Z is $Z_b$, where $Z_b$ is —NH—$Q_{1b}$—NR$_{2b}$R$_{3b}$, —NH—$Q_{1b}$—N$^\oplus$R$_{4b}$R$_{5b}$R$_{6b}$An$^\ominus$;

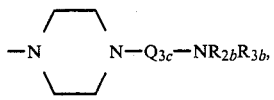

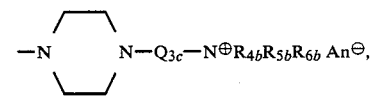

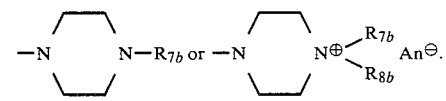

Even more preferably it is $Z_c$, where $Z_c$ is —NH—$Q_{1c}$—NR$_{2b}$R$_{3b}$, —NH—$Q_{1c}$—N$^\oplus$R$_{4b}$R$_{5b}$R$_{6b}$ An$^\ominus$ or

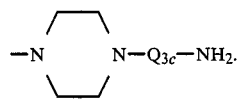

Most preferably Z is $Z_d$, where $Z_d$ is —NH—$Q_{1c}$—NR$_{2c}$R$_{3c}$,

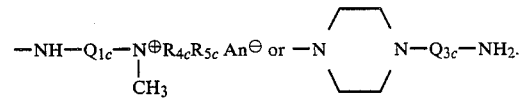

$X_1$ and $X_3$ are preferably $X_{1a}$ and $X_{3a}$, where each $X_{1a}$ and $X_{3a}$ is independently chlorine, hydroxy, amino, methyl, methoxy, phenyl, phenoxy, mono($C_{1-4}$alkyl)amino, di($C_{1-2}$alkyl)amino, mono(hydroxy-$C_{2-4}$alkyl)amino, di(hydroxy-$C_{2-4}$alkyl)amino, phenylamino (the phenyl ring of which is unsubstituted or monosubstituted by chlorine, methyl or methoxy), piperidino, morpholino, piperazino, N-methylpiperazino or $Z_a$.

More preferably $X_1$ and $X_3$ are $X_{1b}$ and $X_{3b}$, where each $X_{1b}$ and $X_{3b}$ is independently chlorine, hydroxy, amino, mono($C_{1-2}$-alkyl)amino, mono(hydroxy-$C_{2-4}$alkyl)amino, di(hydroxy-$C_{2-4}$alkyl)amino or $Z_b$.

Even more preferably $X_1$ and $X_3$ are $X_{1c}$ and $X_{3c}$, where each $X_{1c}$ and $X_{3c}$ is independently $Z_c$.

Most preferably $X_1$ and $X_3$ are $X_{1d}$ and $X_{3d}$, where each $X_{1d}$ and $X_{3d}$ is independently $Z_d$.

$X_2$ and $X_4$ are preferably $X_{2a}$ and $X_{4a}$, where each $X_{2a}$ and $X_{4a}$ is independently $Z_a$. More preferably they are $X_{2b}$ and $X_{4b}$, where each $X_{2b}$ and $X_{4b}$ is independently $Z_b$. Even more preferably they are $X_{2c}$ and $X_{3c}$, where each $X_{2c}$ and $X_{4c}$ is independently $Z_c$. Most preferably $X_2$ and $X_4$ are $X_{2d}$ and $X_{4d}$, where each $X_{2d}$ and $X_{4d}$ is independently $Z_d$.

Preferred compounds according to the invention correspond to formula Ia,

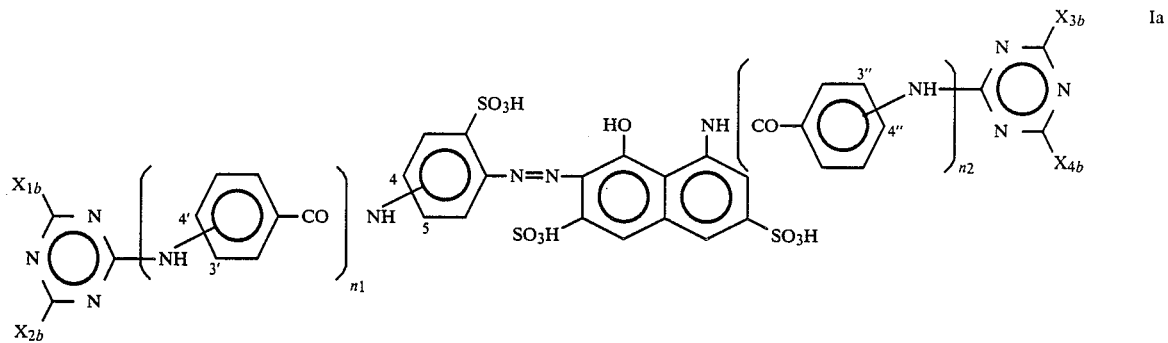

which compounds may be in internal or external salt form, in which one of $n_1$ and $n_2$ is 1, and the other is 0, whereby the amino- or amido-group is bound in the 4- or 5-position of the sulphobenzene diazo component, and the triazinylamino groups are bound in the 3'- or 4'- and 3''- or 4''-positions of the phenyl rings, respectively.

In a compound of formula I or Ia the total number of basic or cationic groups Z present as $X_1$ to $X_4$ is equal to or preferably greater than the total number of sulpho groups present in the molecule.

More preferred are compounds of formula Ia, in which (1) each $X_{1b}$ and $X_{3b}$ is independently $X_{1c}$ and $X_{3c}$, and each $X_{2b}$ and $X_{4b}$ is independently $X_{2c}$ and $X_{4c}$;
(2) those of (1) in which $n_2$ is 1;
(3) those of (1) or (2) in which $X_{1b}$ is $X_{1d}$, $X_{2b}$ is $X_{2d}$, $X_{3b}$ is $X_{3d}$, and $X_{4b}$ is $X_{4d}$;
(4) those of (3) in which $X_{1d}$ to $X_{4d}$ are identical;
(5) those of (1) to (4) in which $n_1$ is 0 and $n_2$ is 1, and the triazinylamino groups are bound in the 4- and 3''-positions, respectively;
(6) $n_2$ is 1.

Normally, in a compound of formula I or Ia the sulphonic acid groups are ionised and are present as $SO_3^{\ominus}$. Each sulphonic acid group may form an internal salt with a basic amino or cationic ammonium group Z. Any basic amino group which does not participate in an internal salt is capable of forming an external salt, —e.g., an acid addition salt by reacting with a suitable acid; examples of suitable acids are mineral acids such as hydrochloric acid, sulphuric acid and phosphoric acid, or preferably organic acids such as formic acid, acetic acid, methoxyacetic acid, lactic acid, citric acid, glycolic acid or methanesulphonic acid. If Z is already in salt form containing a quaternary ammonium group

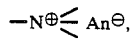

the anion $An^{\ominus}$ may be any non-chromophoric inorganic or organic anion, for example of those conventional in basic dyestuff chemistry. Suitable anions include chloride, bromide, iodide, lactate, acetate, propionate, citrate, oxalate, malate, maleate, succinate, methyl sulphate, ethyl sulphate, hydrogen sulphate and borate.

The present invention further provides a process for the preparation of compounds of formula I comprising reacting the diazonium salt of an amine of formula II,

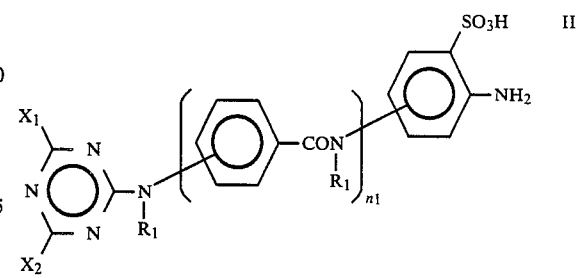

in which $R_1$, $X_1$, $X_2$ and $n_1$ are as defined above, with a compound of formula III,

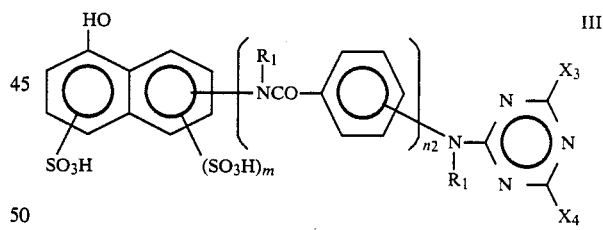

in which $R_1$, $X_3$, $X_4$, m and $n_2$ are as defined above, in a weakly acid to alkaline reaction medium.

Diazotisation and coupling may be effected in accordance with conventional methods. The coupling reaction advantageously is carried out in an aqueous medium in a temperature range of from 0° to 60° C., preferably at 10° to 30° C., and in a preferred pH range of 6 to 9.

The compounds of formula I thus obtained may be isolated in accordance with known methods.

The compounds of formula I containing free basic amino groups may be converted wholly or in part into water-soluble salts by reacting with an inorganic or organic acid given above.

The compounds of formula II used as starting material may be prepared by reacting a compound of formula IV,

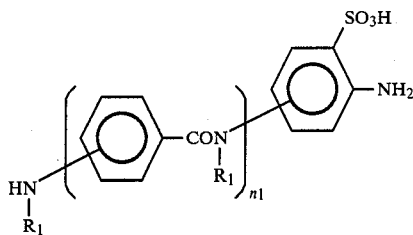

in which $R_1$ and $n_1$ are as defined above, with a compound of formula Va,

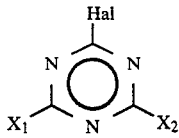

in which $X_1$ and $X_2$ are as defined above, and Hal is halogen.

Likewise, the compounds of formula III may be prepared by reacting a compound of formula VI,

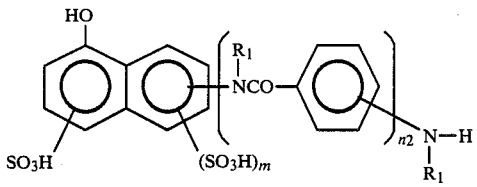

in which $R_1$, m and $n_2$ are as defined above, with a compound of formula Vb,

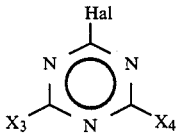

in which $X_3$ and $X_4$ are as defined above, and Hal is halogen.

These condensation reactions may be effected in accordance with known methods under reaction conditions normally used for condensations with monohalotriazinyl compounds.

The compounds of formulae II and III may be isolated from the reaction medium in accordance with known methods.

The starting compounds of formulae IV, Va, Vb and VI are either known or may be prepared by analogy with known methods from available starting materials.

The compounds of formula I, in acid addition salt form or quaternary ammonium salt form, are dyestuffs and may be used for dyeing or printing hydroxy group- or nitrogen- containing organic substrates. They are suitable for dyeing or printing cationic dyeable materials such as homo or mixed polymers of acrylonitrile, acid modified polyester, polyamide e.g. wool leather, cotton, bast fibres such as hemp, flax, sisal, jute, coir and straw regenerated cellulose fibres, glass fibres and paper.

For instance, the compounds of formula I are useful for dyeing or printing fibres, filaments and textiles consisting of or containing cellulose e.g. cotton in accordance with known methods. Cotton is preferably dyed by the conventional exhaust method from a long or short liquor using temperatures from room to boiling temperature. Printing may be effected by impregnation with a printing paste produced by known methods.

The new compounds can also be used for dyeing or printing of leather, including low affinity vegetable-tanned leather, as well as glass or glass products consisting of variable chemical components in accordance with known methods. Furthermore, the dyestuffs are suitable for the preparation of inks in accordance with conventional methods.

Most preferably, the compounds are useful for dyeing or printing of paper e.g., for the preparation of sized or unsized, wood-free or ligneous paper. They may be used for the production of pulp-coloured paper or of paper dyed in the size press. Similarly, the dyestuffs may be used for dyeing paper by the dipping process. The dyeing and printing of paper is effected by known methods.

The dyeings and prints and particularly those obtained on paper show good general fastness properties.

The compounds of formula I may be converted into dyeing preparations. Processing into stable liquid, preferably aqueous, or solid dyeing preparations may take place in a generally known manner, advantageously, suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid; furthermore formamide, dimethylformamide, urea, glycols and ethers thereof, dextrin or addition products of boric acid with sorbit; which may be used together with water, optionally adding an assistant, e.g. a stabiliser. Such preparations may be obtained, for example, as described in French Patent Specification 1,572,030.

An example of a suitable liquid dye preparation is (all parts are by weight):
100 parts of a compound of formula I in acid addition salt form or in quaternary ammonium salt form
0-10 parts, preferably 0-1 part, of an inorganic salt
1-100 parts of an organic acid such as formic, acetic, lactic, citric acid etc.
100-800 parts of water
0-500 parts of a solubilising agent (e.g., glycols such as ethylene glycol, propylene glycol, diethylene glycol, triethylene glycol, hexylene glycol; glycol ethers such as methyl cellosolve, methyl carbitol, butylpolyglycol; urea; formamide and dimethylformamide).

Advantageously, solid dyeing preparations may be made by grinding or, preferably, granulating, for example, in accordance with the method described in French Patent Specification 1,581,900.

A suitable granulated preparation comprises (all parts are by weight):
100 parts of a compound of formula I in acid addition salt form or quaternary ammonium salt form
0-10 parts, preferably 0-1 part, of an inorganic salt
0-800 parts of a standardising agent (preferably nonionic such as dextrin, sugar, glucose and urea).

The solid preparations may contain up to 10% residual moisture.

The compounds of formula I in salt form have good solubility especially in cold water. Owing to their high substantivity the dyestuffs exhaust practically quantitatively and show a good build-up power. When producing sized or unsized paper the waste water is essentially colourless. The dyestuffs can be added to the stock directly, i.e. without previously dissolving, as a dry powder or granule, without reducing the brilliance or the yield of colour. The sized paper dyeing when compared with the corresponding unsized paper dyeing does not show any decrease in strength. The dyestuffs can also be used in soft water without loss of yield. They do not mottle applied on paper, and they are not inclined to give two-sided dyeing on paper and are practically insensitive to filler or pH variations.

The paper dyeings made with the compounds according to the invention are clear and brilliant and have notably good light fastness; on exposure to light for a long time the shade of the dyeing fades tone-in-tone. The dyeings on paper show high wet fastness properties; they are fast not only to water but also to milk, fruit juice, sweetened mineral water, tonic water, soap and sodium chloride solution, urine etc. Furthermore, the paper dyeings have good alcohol fastness properties.

Paper dyed with the new dyestuffs can be bleached oxidatively or reductively which is important for the recycling of waste and old paper.

The dyestuffs may also be used to dye paper containing wood-pulp where even dyeings having good fastness properties are obtained. Furthermore, the dyestuffs may be used for the production of coated paper in accordance with known manner. Preferably, a suitable filler, for example kaolin, which due to its tendency for pigmentation is dyed with the dyestuff, is employed to give a one side coated paper.

The compounds of formula I are not only suitable as single dyes, they are also suitable for dyeing in combination with other dyes. They can be used both as ready mixtures, or the components of those mixtures can be added to the substrate separately. The dyeings obtained from combining compounds of formula I with appropriate dyes showing a comparable dyeing behaviour have good fastness properties.

Suitable dyes for a mixture are substantive dyes which preferably contain cationic or basic groups. Particularly preferred for such mixtures are copper phthalocyanine dyes having cationic and/or basic groups, which optionally contain sulphonic acid groups. These mixtures yield brilliant blue shades of high purity. Suitable copper phthalocyanine dyes are described, for example, in British patent specifications No. 2,104,538 and 1,185,791, European Patent Publication 114,325, and U.S. Pat. Nos. 3,784,599, 4,393,005, 4,448,722 and 4,521,217.

The following Examples further serve to illustrate the invention. In the Examples all parts and all percentages are by weight or volume, and the temperatures given are in degrees Centigrade, unless indicated to the contrary.

EXAMPLE 1

(a) diazo component

37 Parts of 2,4-di(3′-N,N-diethylaminopropylamino)-6-chlorotriazine are stirred into 200 parts of water adding hydrochloric acid until a clear solution of pH 6–7 is formed. Whilst stirring, 18 parts of 1,4-diaminobenzene-2-sulphonic acid, and subsequently 25 parts of sodium acetate are added. The suspension thus obtained is heated to 90°. After a short time the reactants dissolve, and after ca. one hour at 90° the reaction is completed. The reaction mixture is cooled to room temperature, and 52 parts of the compound having the formula

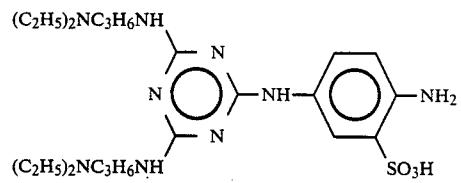

are obtained which remain in solution. This solution can be used directly without isolating the diazo component.

(b) coupling component

37 Parts of 2,4-di(3′-N,N-diethylaminopropylamino)-6-chlorotriazine are stirred into 200 parts of water, adding hydrochloric acid in such an amount that pH 6–7 is reached. Subsequently, 42 parts of 1-(3′-aminobenzamido)-8-hydroxynaphthalene-3,6-disulphonic acid are added, and the mixture is heated to 95°–100° whilst stirring. The pH is adjusted at 3 by adding sodium acetate. After ca. one hour the condensation at 95°–100° is completed. The reaction solution is cooled to room temperature with stirring, whereby the reaction product precipitates in crystalline form. After filtering and drying, 60 parts of the compound having the formula

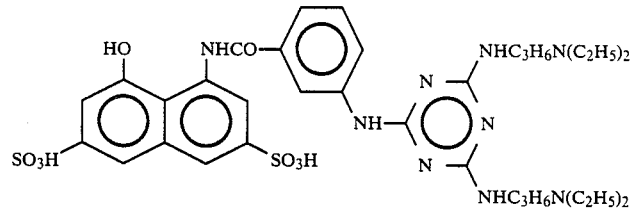

are obtained.

(c) end product

To 300 parts of the solution obtained according to step (a) and containing 52 parts of the diazo component, 100 parts ice and 30 parts concentrated hydrochloric acid are added. To this mixture 27 parts of a 4N sodium nitrite solution are added dropwise at 0°–5°, and the mixture is stirred for a further 30 minutes. After this time the diazotisation is completed. Any excess nitrous acid is then decomposed by adding a small amount of sulphamic acid.

80 Parts of the coupling component prepared according to step (b) are dissolved in 300 parts water adjusted to pH 8–9 by adding sodium hydroxide solution. To this solution the diazo solution as prepared above is added dropwise, whilst keeping the pH at 8–9 by adding sodium hydroxide solution. Coupling commences spontaneously, and a violet dyestuff is obtained which partly precipitates. When coupling is completed, 100 parts of sodium hydroxide solution are added all at once, whereby the dyestuff thus formed precipitates completely. 180 Parts of a dark powder containing 110 parts of the dyestuff having the formula

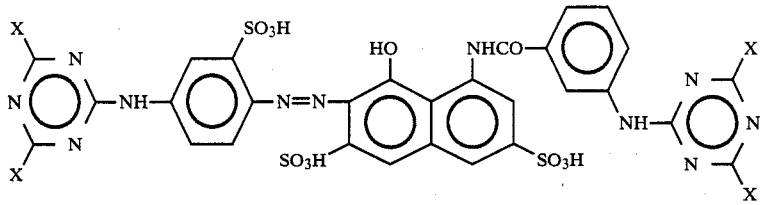

in which each X is $-NHC_3H_6N(C_2H_5)_2$ are obtained.

This dyestuff is well soluble in an acid to weakly alkaline aqueous medium. In acid addition salt form it dyes paper a brilliant violet shade. The paper dyeings show notably good properties with respect to waste water- and wet-fastnesses and also light fastness.

By a method analogous to that described in step (a) of Example 1 further diazo components may be prepared using appropriate starting compounds. It is also possible to employ instead of a di-condensation product (cyanuric chloride containing two identical or different basic amino groups), a mono-condensation product in which only one chlorine is replaced with a basic amino group, or a di-condensation product containing in addition to one basic amino group one further group different from chlorine and a basic amino group. The necessary separate condensation reactions may be carried out in accordance with known reaction conditions.

The diazo components thus obtainable correspond to formula (A),

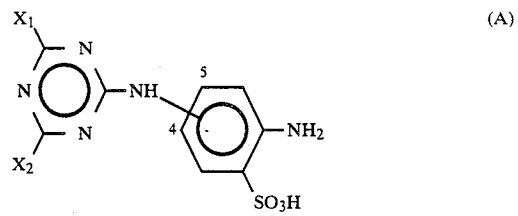

in which the symbols are defined in the following Table 1. In this Table and in all following Tables $An^\ominus$ is an anion of the reaction medium.

TABLE 1

| comp. No. | $X_1$ | $X_2$ | position of triazinyl-NH— |
|---|---|---|---|
| a2 | $-NHC_3H_6N(CH_3)_2$ | same as $X_1$ | 4 |
| a3 | " | $-NHC_3H_6N(C_2H_5)_2$ | 4 |
| a4 | $-NHC_3H_6N(C_2H_5)_2$ | same as $X_1$ | 5 |
| a5 | $-NHCH_2\underset{\underset{CH_3}{\vert}}{C}HNH_2$ | same as $X_1$ | 4 |
| a6 | " | same as $X_1$ | 5 |
| a7 | " | $-NHC_3H_6N(C_2H_5)_2$ | 4 |
| a8 | " | $-NHC_3H_6N(CH_3)_2$ | 4 |
| a9 | $-NHC_2H_4NH_2$ | " | 4 |
| a10 | $-NHC_3H_6NH_2$ | $-NHC_3H_6N(C_2H_5)_2$ | 4 |
| a11 | $-N\underset{\diagup\diagdown}{\phantom{X}}NC_2H_4NH_2$ | " | 4 |
| a12 | " | " | 5 |
| a13 | " | same as $X_1$ | 4 |
| a14 | $-NHC_2H_4NHC_2H_4NH_2$ | $-NHC_3H_6N(C_2H_5)_2$ | 4 |
| a15 | $-N\underset{\diagup\diagdown}{\phantom{X}}NCH_3$ | " | 5 |
| a16 | $-Cl$ | " | 4 |
| a17 | $-NH_2$ | " | 4 |
| a18 | $-OCH_3$ | " | 4 |
| a19 | $-N\underset{\diagup\diagdown}{\phantom{X}}N^\oplus(CH_3)_2An^\ominus$ | " | 4 |
| a20 | $-NHC_3H_6N(CH_2CH_2OH)_2$ | same as $X_1$ | 5 |

TABLE 1-continued

| comp. No. | compounds of formula (A) | | position of triazinyl-NH— |
|---|---|---|---|
| | $X_1$ | $X_2$ | |
| a21 | —N(piperazinyl)NCH$_3$ | —N(piperazinyl)NC$_2$H$_4$N(CH$_3$)$_2$ | 4 |

EXAMPLES 2–29

By a method analogous to that described in Example 1 further compounds of formula I may be prepared using appropriate starting compounds. They correspond to formula (B),

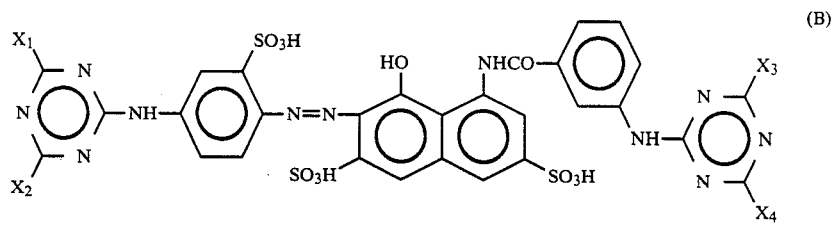

(B)

in which the symbols are defined in the following Table 2. These compounds of Table 2 dye paper a violet shade. The paper dyeings show good properties with respect to waste water-, light- and wet-fastness.

TABLE 2

| Ex. No. | compounds of formula (B) | | | |
|---|---|---|---|---|
| | $X_1$ | $X_2$ | $X_3$ | $X_4$ |
| 2 | —NHC$_3$H$_6$N(CH$_3$)$_2$ | same as $X_1$ | same as $X_1$ | same as $X_1$ |
| 3 | —NHCH$_2$CHNH$_2$ \| CH$_3$ | same as $X_1$ | same as $X_1$ | same as $X_1$ |
| 4 | —NHC$_3$H$_6$N(C$_2$H$_5$)$_2$ | same as $X_1$ | —NHCH$_2$CHNH$_2$ \| CH$_3$ | same as $X_3$ |
| 5 | —NHCH$_2$CHNH$_2$ \| CH$_3$ | same as $X_1$ | —NHC$_3$H$_6$N(C$_2$H$_5$)$_2$ | same as $X_3$ |
| 6 | —N(piperazinyl)NC$_2$H$_4$NH$_2$ | same as $X_1$ | " | same as $X_3$ |
| 7 | —NHC$_3$H$_6$N(C$_2$H$_5$)$_2$ | —Cl | same as $X_1$ | same as $X_1$ |
| 8 | " | —NH$_2$ | same as $X_1$ | same as $X_1$ |
| 9 | —NHC$_2$H$_4$NH$_2$ | same as $X_1$ | same as $X_1$ | same as $X_1$ |
| 10 | " | same as $X_1$ | —NHC$_3$H$_6$N(C$_2$H$_5$)$_2$ | same as $X_3$ |
| 11 | —NHC$_3$H$_6$N(C$_2$H$_5$)$_2$ | —NHC$_2$H$_4$NH$_2$ | " | same as $X_3$ |
| 12 | " | —NHCH$_2$CHNH$_2$ \| CH$_3$ | " | same as $X_3$ |
| 13 | —NHC$_3$H$_6$N(C$_2$H$_5$)$_2$ | —N(piperazinyl)NC$_2$H$_4$NH$_2$ | —NHC$_3$H$_6$N(C$_2$H$_5$)$_2$ | same as $X_3$ |
| 14 | " | —N(piperazinyl)NCH$_3$ | " | same as $X_3$ |
| 15 | " | " | —NHC$_3$H$_6$N(CH$_3$)$_2$ | same as $X_3$ |

TABLE 2-continued compounds of formula (B)

| Ex. No. | X₁ | X₂ | X₃ | X₄ |
|---|---|---|---|---|
| 16 | $-NHC_3H_6N(CH_3)_2$ | $-N\diagup\diagdown N^{\oplus}(CH_3)_2 An^{\ominus}$ | " | same as X₃ |
| 17 | " | $-NHCH_2CHNH_2$<br>$\quad\quad\quad\vert$<br>$\quad\quad\quad CH_3$ | " | same as X₃ |
| 18 | $-N\diagup\diagdown NC_2H_4NH_2$ | $-NHC_2H_4NH_2$ | $-NHC_3H_6N(C_2H_5)_2$ | same as X₃ |
| 19 | " | " | " | $-Cl$ |
| 20 | $-N\diagup\diagdown NC_2H_4OH$ | same as X₁ | " | same as X₃ |
| 21 | " | $-NHC_2H_4NH_2$ | " | same as X₃ |
| 22 | $-NHC_3H_6N(C_2H_5)_2$ | same as X₁ | $-N\diagup\diagdown NC_2H_4NH_2$ | same as X₃ |
| 23 | " | $-NHCH_2CHNH_2$<br>$\quad\quad\quad\vert$<br>$\quad\quad\quad CH_3$ | $-N\diagup\diagdown N^{\oplus}(CH_3)_2 An^{\ominus}$ | same as X₃ |
| 24 | " | " | $-N\diagup\diagdown NC_2H_4NH_2$ | same as X₃ |
| 25 | " | " | $-N\diagup\diagdown NC_2H_4OH$ | same as X₃ |
| 26 | " | same as X₁ | $-NHCH_2CHNH_2$<br>$\quad\quad\quad\vert$<br>$\quad\quad\quad CH_3$ | same as X₁ |
| 27 | " | same as X₁ | $-NHC_2H_4NH_2$ | same as X₁ |
| 28 | $-NHC_3H_6N^{\oplus}(CH_3)_3 An^{\ominus}$ | same as X₁ | same as X₁ | same as X₁ |
| 29 | $-NHC_3H_6N(CH_3)_2$ | same as X₁ | $-NHCH_2CHNH_2$<br>$\quad\quad\quad\vert$<br>$\quad\quad\quad CH_3$ | same as X₃ |

EXAMPLE 30

270 Parts of an aqueous, weakly acid solution containing 38 parts of 2,4-di(3'-N,N-diethylaminopropylamino)-6-chlorotriazine are added to 30.7 parts of 4,4'-diaminobenzanilide-3'-sulphonic acid. To this mixture 25 parts of sodium acetate are added, and the mixture is heated to 95°, whereby the reactants dissolve. The solution thus obtained is stirred for two hours at 95°, and is then cooled to room temperature. Subsequently, 100 parts ice and 30 parts concentrated hydrochloric acid are added. Diazotisation is effected by adding 27 parts of a 4 N sodium nitrite solution. This solution of the diazonium compound is then added dropwise to the soda-alkaline solution containing 66 parts of the coupling component of the formula

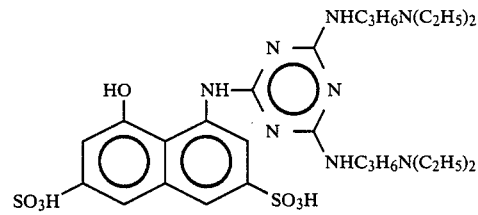

A violet dye solution is obtained from which, at the end of the coupling reaction, the dyestuff partly precipitates. The dye precipitation is completed by adding sodium hydroxide solution. The dyestuff thus obtained using appropriate starting compounds. They correspond to formula (C),

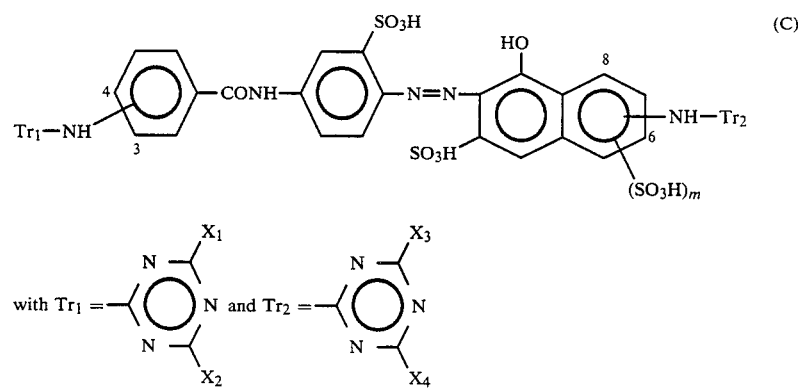

which is separated from the aqueous phase and dried, corresponds to the formula in which the symbols are defined in the following Table 3. These compounds dye paper a scarlet and violet

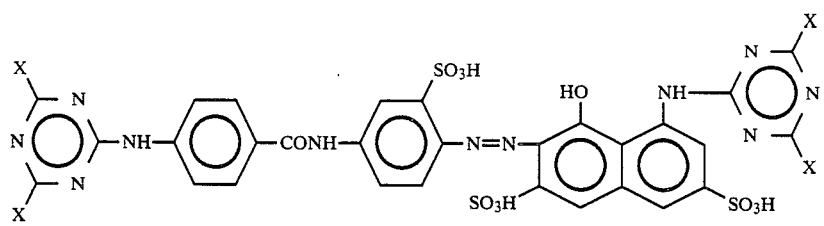

in which each X is $-NHC_3H_6N(C_2H_5)_2$.

In acid addition salt form it dyes paper a pure violet shade. Waste water- and wet-fastness properties of these paper dyeings are notably good, and especially good is their light fastness.

EXAMPLES 31–45

By a method analogous to that described in Example 30 further compounds of formula I may be prepared shade, respectively. The paper dyeings show good properties with respect to light-, waste water- and wet-fastnesses.

In the last column N of this Table 3 the shade of paper dyeing obtained with each dyestuff is given, whereby a is violet and b is scarlet.

TABLE 3 compounds of formula (C)

| Ex. No. | $X_1$ | $X_2$ | $X_3$ | $X_4$ | position of $Tr_1$-NH— | position of $Tr_2$-NH— | m (position) | N |
|---|---|---|---|---|---|---|---|---|
| 31 | $-NHC_3H_6N(C_2H_5)_2$ | same as $X_1$ | same as $X_1$ | same as $X_1$ | 3 | 8 | 1 (6) | a |
| 32 | " | same as $X_1$ | same as $X_1$ | same as $X_1$ | 3 | 6 | 0 | b |
| 33 | $-NHC_3H_6N(CH_3)_2$ | same as $X_1$ | same as $X_1$ | same as $X_1$ | 4 | 8 | 1 (6) | a |
| 34 | " | same as $X_1$ | same as $X_1$ | same as $X_1$ | 4 | 6 | 0 | b |
| 35 | $-N\overset{\frown}{\phantom{x}}NC_2H_4NH_2$ | same as $X_1$ | $-NHC_3H_6N(C_2H_5)_2$ | same as $X_3$ | 4 | 8 | 1 (6) | a |
| 36 | $-NHC_2H_4NH_2$ | same as $X_1$ | " | same as $X_3$ | 3 | 8 | 1 (6) | a |
| 37 | " | same as $X_1$ | same as $X_1$ | same as $X_1$ | 4 | 8 | 1 (6) | a |
| 38 | " | same as $X_1$ | same as $X_1$ | same as $X_1$ | 4 | 6 | 0 | b |
| 39 | $-NHCH_2CHNH_2$ <br> $\phantom{-NHCH_2}CH_3$ | same as $X_1$ | same as $X_1$ | same as $X_1$ | 4 | 8 | 1 (6) | a |
| 40 | " | same as $X_1$ | same as $X_1$ | same as $X_1$ | 3 | 6 | 0 | b |
| 41 | " | same as $X_1$ | $-NHC_3H_6N(C_2H_5)_2$ | same as $X_3$ | 3 | 8 | 1 (6) | a |
| 42 | " | same as $X_1$ | " | same as $X_3$ | 4 | 8 | 1 (6) | a |
| 43 | $-N\overset{\frown}{\phantom{x}}NC_2H_4NH_2$ | $-NHC_2H_4NH_2$ | " | $-Cl$ | 4 | 6 | 0 | b |

TABLE 3-continued

| | compounds of formula (C) | | | | position of Tr₁-NH— | position of Tr₂-NH— | m (position) | N |
|---|---|---|---|---|---|---|---|---|
| Ex. No. | X₁ | X₂ | X₃ | X₄ | | | | |
| 44 | —NHC₃H₆N⊕(CH₃)₃An⊖ | same as X₁ | same as X₁ | same as X₁ | 4 | 8 | 1 (6) | a |
| 45 | —NHC₃H₆N(C₂H₅)₂ | same as X₁ | —NHCH₂CHNH₂<br>\|<br>CH₃ | same as X₃ | 3 | 8 | 1 (6) | a |

EXAMPLE 46

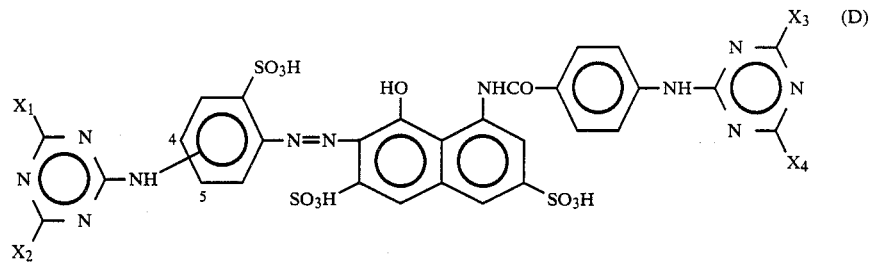

If a method analogous to that described in Example 1 is applied using in step b) 42 parts of 1-(4'-aminobenzamido)-8-hydroxynaphthalene-3,6-disulphonic acid, a dyestuff having the formula,

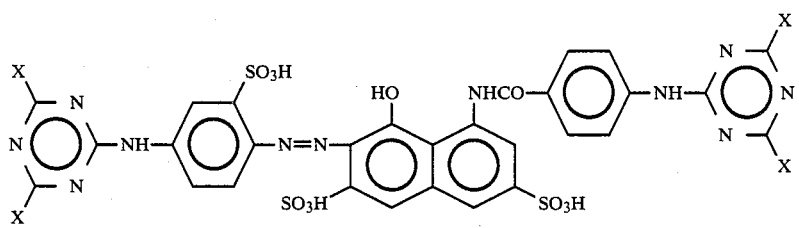

in which each X is —NHC₃H₆N(C₂H₅)₂, is obtained. In acid addition salt form it dyes paper a violet shade. The paper dyeings obtained show good fastness properties.

EXAMPLES 47–52

By a method analogous to that described in Example 46 further compounds of formula I may be prepared using appropriate starting compounds. They correspond to formula (D), in which the symbols are defined in the following Table 4. The listed compounds dye paper a violet shade. These dyeings show good fastness properties.

TABLE 4

| | compounds of formula (D) | | | | position of triazinyl-NH— |
|---|---|---|---|---|---|
| Ex. No. | X₁ | X₂ | X₃ | X₄ | |
| 47 | —NHC₃H₆N(CH₃)₂ | same as X₁ | same as X₁ | same as X₁ | 4 |
| 48 | —NHC₃H₆N(C₂H₅)₂ | same as X₁ | same as X₁ | same as X₁ | 5 |
| 49 | " | same as X₁ | —NHCH₂CHNH₂<br>\|<br>CH₃ | same as X₃ | 4 |
| 50 | —NHCH₂CHNH₂<br>\|<br>CH₃ | same as X₁ | —NHC₃H₆N(C₂H₅)₂ | same as X₃ | 5 |
| 51 | —N(C₄H₈)NC₂H₄NH₂ | same as X₁ | " | same as X₃ | 4 |
| 52 | —NHC₃H₆N(C₂H₅)₂ | —NHC₂H₄NH₂ | " | same as X₃ | 4 |

EXAMPLE 53

The end product obtained according to Example 1(c), in the form of a wet press cake which contains 110 parts of pure dyestuff, is stirred into 500 parts of water, and 22 parts of formic acid are added. By heating to 80° the dyestuff dissolves completely. The dye solution is evaporated to dryness. A dyestuff salt having the formula,

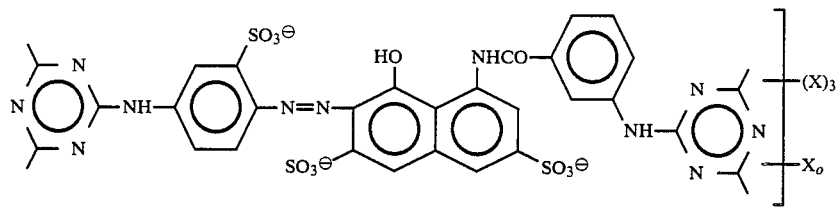

in which
each X is —NHC$_3$H$_6$N$^\oplus$H(C$_2$H$_5$)$_2$, and
X$_o$ is —NHC$_3$H$_6$N$^\oplus$H(C$_2$H$_5$)$_2$ HCOO$^\ominus$,
is obtained in powder form which has good solubility in cold water.

Instead of using formic acid according to Example 53 any other organic acid such as lactic, acetic or methoxyacetic acid or a mixture thereof may be used to form external salts.

By a method analogous to that described in Example 53 the dyes of Examples 2–6, 9–15, 17, 18, 20–22, 24–27, 29–43, and 45–52 may also be converted into acid addition salt form.

EXAMPLE 54

The wet press cake obtained in Example 1(c) is added at room temperature to a solution of 20 parts of dextrin, 20 parts of acetic acid and 500 parts of water, and is dissolved by heating to 80°. By spray drying dark granules, which are well soluble in water and dye paper a violet shade, are obtained.

In analogous manner, the dye salts of Examples 2–52 may also be converted into granules.

EXAMPLE 55

The wet press cake obtained in Example 1(c) is added to a solvent mixture of 20 parts of lactic acid and 250 parts of water and is dissolved by heating to 70°. Subsequently, this dyestuff solution is filtered clear in the presence of a filtering auxiliary. The filtrate is cooled to room temperature and is adjusted to 520 parts by adding water. A ready-to-use dye solution is obtained which is stable to storage for several months. This dye solution may be used directly or thinned with water in dyeing paper where paper dyeings of violet shades are obtained.

In analogous manner, the dye salts of Examples 2–52 may be converted into stable aqueous-liquid preparations.

EXAMPLE 56

2 Parts of a dye solution obtained from 14 parts of a known copper phthalocyanine dyestuff having the formula,

in which q is 2.5–3.5, preferably 3.1, and 1 part of the dye solution obtained from 10 parts of the monoazo dye according to Example 1, dissolved in water and lactic acid, are mixed together.

If this mixture is employed according to the method given in Application Example G as set forth below, paper dyeings are obtained having a brilliant blue shade. These paper dyeings show perfect light- and wet-fastness properties.

Instead of the dyestuff of Example 1, each dyestuff of Examples 2–52 can also be used as a component in these mixtures. Such dyestuff mixtures dye paper a brilliant blue shade, the dyeings obtained have good fastness properties.

EXAMPLES 57 to 65

If instead of the phthalocyanine dyestuff component used in Example 56, the following copper phthalocyanine dyes (57) to (65) which are similarly known from the literature or mixtures thereof are employed, brilliant blue paper dyeings are obtained with the dye mixtures prepared and employed according to Example 56, having very good fastness properties.

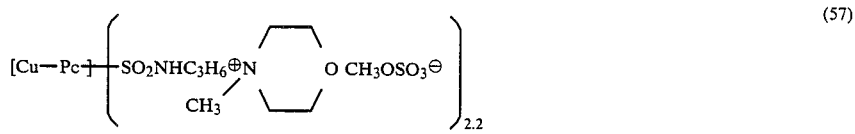

(57)

(58)

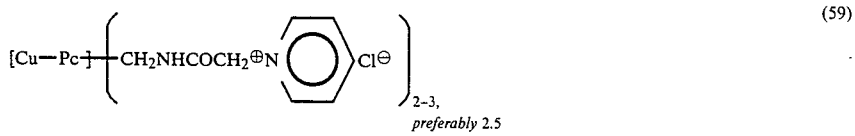

(59)

-continued

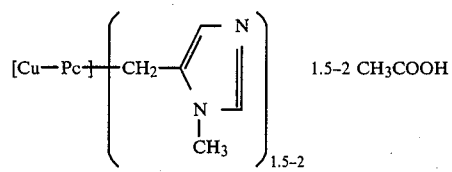 (60)

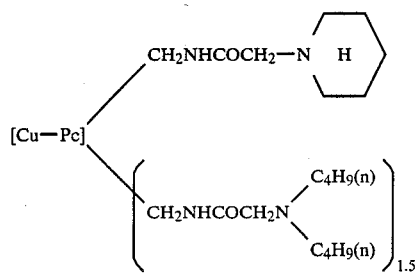 (61)

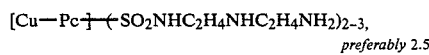 (62)

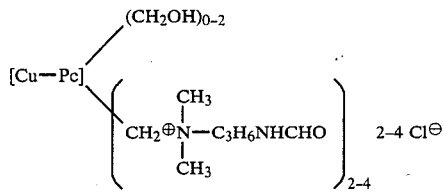 (63)

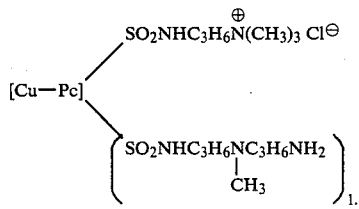 (64)

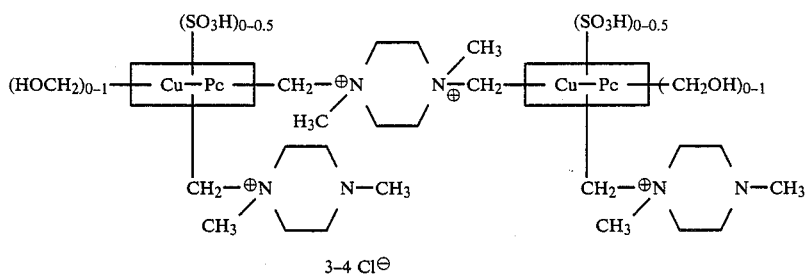 (65)

The preceding copper phthalocyanine dyes (57) to (65) are known, for example from British Pat. Nos. 2,104,538 and 1,185,791, European Patent Publication 114,325, U.S. Pat. Nos. 3,784,599, 4,393,005, 4,448,722 and 4,521,217.

In the following examples the application of the dyes and dye mixtures as well as liquid-aqueous dye preparations thereof is illustrated.

APPLICATION EXAMPLE A

70 Parts of chemically bleached sulphite cellulose obtained from pinewood and 30 parts of chemically bleached sulphite cellulose obtained from birchwood are ground in 2000 parts of water in a hollander. 0.2 Parts of the dyestuff according to Example 1(c) (as an acid addition salt, e.g., according to Example 53) are sprinkled into this pulp, or 2.0 parts of the liquid dyeing preparation according to Example 55 are added thereto. Paper is produced from this pulp after mixing for 20 minutes. The absorbent paper which is obtained in this manner is dyed a violet shade. The waste water is practically colourless.

APPLICATION EXAMPLE B 0.3 Parts of the dyestuff powder according to Example 1(c) (as an acid addition salt, e.g., according to Example 53) are dissolved in 100 parts of hot water and cooled to room temperature. This solution is added to 100 parts of chemically bleached sulphite cellulose which have been ground in a hollander with 2000 parts of water. Sizing is effected in conventional manner after thorough mixing for 15 minutes using resin size and aluminum sulphate. The paper which is produced from this material has a violet shade and shows good waste water- and wet-fastness properties.

APPLICATION EXAMPLE C

An absorbent length of unsized paper is drawn at 40°-50° through a dyestuff solution having the following composition:

0.3 parts of the dyestuff according to Example 1(c)(as an acid addition salt, e.g. according to Example 53) or 3 parts of the liquid dyeing preparation according to Example 55,
0.5 parts of starch and
99.0 parts of water.

The excess dyestuff solution is squeezed out through two rollers. The dried length of paper is dyed a violet shade.

The dyestuffs of Examples 2 to 52 (in appropriate salt form) or a dyeing preparation thereof according to Example 54 or 55 may also be used for dyeing by a method analogous to that of Application Examples A to C. The paper dyeings obtained show good fastness properties.

APPLICATION EXAMPLE D 0.2 Parts of the dyestuff of Example 1 in acid addition salt form (according to Example 53) are dissolved in 4000 parts of demineralised water at 40°. 100 Parts of a pre-wetted cotton textile substrate are added, and the bath is raised to the boiling point over 30 minutes and held at the boil for one hour. Any water which evaporates during dyeing is replaced continuously. The dyed substrate is removed from the bath, and after rinsing and drying, a violet dyeing is obtained having good light- and wet-fastness properties. The dyestuff exhausts practically totally onto the fibre, and the waste water is almost colourless.

In a similar manner as described in Application Example D the dyestuffs according to Examples 2-52 may be used for dyeing cotton.

APPLICATION EXAMPLE E

100 Parts freshly tanned and neutralised chrome leather are agitated for 30 minutes in a vessel with a liquor consisting of 250 parts of water at 55° and 0.5 parts of the dyestuff of Example 1 in acid addition salt form, and then treated in the same bath for 30 minutes with 2 parts of an anionic fatty liquor based on sulphonated train oil. The leather is then dried and prepared in the normal way, giving a leather evenly dyed in a violet shade.

By a method analogous to that described in Application Example E the dyestuffs according to Examples 2-52 may be used for dyeing leather.

Further vegetable-tanned leathers of low affinity may be dyed using the dyestuffs as described herein in accordance with known methods.

APPLICATION EXAMPLE F

Water is added to a dry pulp in a hollander consisting of 60% (by weight) of mechanical wood pulp and 40% (by weight) of unbleached sulphite cellulose, and the slurry is beaten in order to obtain a dry content slightly exceeding 2.5% and having a beating degree of 40°SR (degrees Schopper-Riegler). The slurry is then exactly adjusted to a high density dry content of 2.5% by adding water.

5 Parts of a 2.5% aqueous solution of the dyestuff according to Example 1(c) are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are dyed in an intense violet shade.

By a method analogous to that described in Application Example F any one of the dyestuffs of Examples 2-52 may be used instead of that of Example 1. In all cases, the waste paper exhibits a substantially low residual dye concentration.

APPLICATION EXAMPLE G

Water is added to a dry pulp in a hollander consisting of 50% (by weight) of chemically bleached sulphite cellulose obtained from pinewood and 50% (by weight) of chemically bleached sulphite cellulose obtained from birchwood, and the slurry is ground until a degree of grinding of 35°SR is reached. The slurry is then adjusted to a high density dry content of 2.5% by adding water, and the pH of this suspension is adjusted to 7.

10 Parts of a 0.5% aqueous solution of the dyestuff mixture adjusted according to Example 56 are added to 200 parts of the above resulting slurry, and the mixture is stirred for 5 minutes. The resulting pulp is diluted with 500 parts water and then used for the production of sheets by suction on a sheet former. The paper sheets thus obtained have a brilliant blue shade.

By a method analogous to that described in Application Example G further dye mixtures may be used consisting of any one of the dyestuffs of Examples 2-52 and/or any one of the phthalocyanine dyes listed as compounds No. (57) to (65). In all cases, paper sheets are formed having a brilliant blue shade.

What is claimed is:

1. A compound of the formula

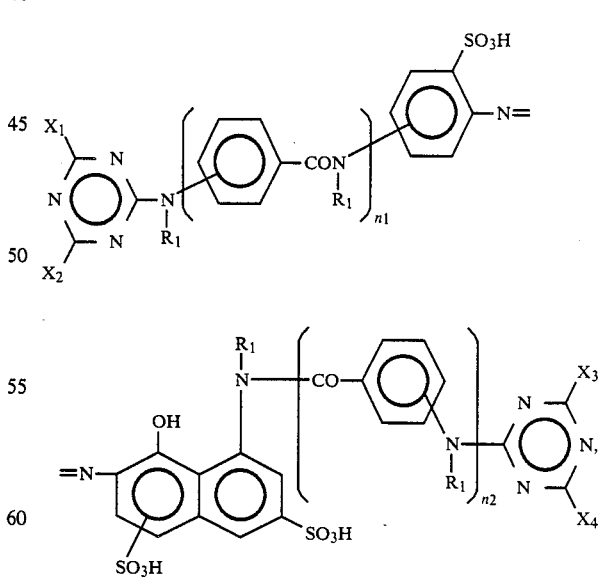

or an internal or external salt thereof,
wherein
each $R_1$ is independently hydrogen, $C_{1-4}$alkyl or $C_{1-4}$alkyl monosubstituted by hydroxy halo, cyano or $C_{1-4}$alkoxy, each of $X_1$ and $X_3$ is independently halo, hydroxy, $C_{1-4}$alkyl, $C_{1-4}$alkoxy, phenyl, phenoxy, amino or an aliphatic, cycloaliphatic, aromatic or heterocyclic amino group, each of $X_2$ and $X_4$ is independently an aliphatic, cycloaliphatic, aromatic or heterocyclic amino group containing at least one protonatable nitrogen atom or quaternary ammonium group, and each of $n_1$ and $n_2$ is independently 0 or 1, with the proviso that $n_1+n_2$ is 1 or 2, wherein each halo is independently fluoro, chloro or bromo, with the provisos that (1) the total number of basic and cationic groups present as $X_1$-$X_4$ equals or exceeds the number of sulfo groups, (2) the hydroxy or alkoxy group of each hydroxy- or alkoxy-substituted alkyl group or alkylene radical attached to a nitrogen atom is bound to a carbon atom other than the $C_1$-atom, and (3) the hydroxy groups of each alkylene radical substituted by two hydroxy groups are attached to different carbon atoms, or a mixture of such compounds or salts.

2. A compound according to claim 1, or an internal or external salt thereof.

3. A compound according to claim 2, or an internal or external salt thereof,
wherein
each of $X_1$ and $X_3$ is independently halo; hydroxy; $C_{1-4}$alkyl; $C_{1-4}$alkoxy; phenyl; phenoxy; —N($R_{10}$)$_2$; $C_{5-6}$cycloalkylamino; $C_{5-6}$cycloalkylamino the $C_{5-6}$cycloalkyl ring of which is substituted by 1 or 2 $C_{1-2}$alkyl groups; phenylamino; phenylamino the phenyl ring of which is substituted by 1 or 2 substituents selected from the group consisting of halo, $C_{1-4}$alkyl, $C_{1-4}$alkoxy, hydroxy and phenoxy; or Z,
wherein
each $R_{10}$ is independently hydrogen, $C_{1-4}$alkyl or $C_{1-4}$-alkyl monosubstituted by halo, $C_{1-4}$alkoxy, phenyl or hydroxy, or
—N($R_{10}$)$_2$ is an unsubstituted 5- or 6-membered ring containing a total of 1 or 2 nitrogen atoms or 1 nitrogen atom and 1 oxygen or sulfur atom, which ring is unsubstituted or substituted by 1 or 2 $C_{1-4}$alkyl groups, and each of $X_2$ and $X_4$ is independently Z,
wherein
each Z is independently —NR$_1$—(Q$_2$—NR$_1$)$_p$—Q$_1$—NR$_2$R$_3$, —NR$_1$—(Q$_2$—NR$_1$)$_p$—Q$_1$—N$^\oplus$R$_4$R$_5$R$_6$An$^\ominus$,

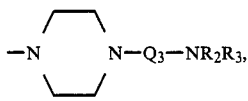

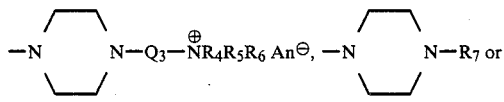

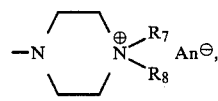

wherein
$Q_1$ is linear or branched $C_{2-8}$alkylene; linear or branched $C_{3-6}$alkylene substituted by 1 or 2 hydroxy groups; linear or branched $C_{1-6}$-alkylene-1,3-phenylene; linear or branched $C_{1-6}$alkylene-1,4-phenylene; 1,3-phenylene; 1,4-phenylene or *—NHCO—CH$_2$—,
wherein the * denotes the atom attached to the —NR$_1$—radical, each $Q_2$ is independently linear or branched $C_{2-8}$alkylene; linear or branched $C_{3-6}$alkylene substituted by 1 or 2 hydroxy groups; linear or branched $C_{1-6}$alkylene-1,3-phenylene; linear or branched $C_{1-6}$alkylene-1,4-phenylene; 1,3-phenylene or 1,4-phenylene, $Q_3$ is linear or branched $C_{2-8}$alkylene, each of $R_2$ and $R_3$ is independently hydrogen; $C_{1-6}$alkyl; $C_{2-6}$alkyl monosubstituted by hydroxy or cyano; phenyl; phenyl substituted by 1 to 3 substituents selected from chloro, $C_{1-4}$alkyl and $C_{1-4}$alkoxy; phenyl($C_{1-4}$alkyl); phenyl($C_{1-4}$alkyl) the phenyl ring of which is substituted by 1 to 3 substituents selected from chloro, $C_{1-4}$alkyl and $C_{1-4}$alkoxy; $C_{5-6}$cycloalkyl or $C_{5-6}$-cycloalkyl substituted by 1 to 3 $C_{1-4}$alkyl groups, or —NR$_2$R$_3$ is a 5- or 6-membered ring containing 1 to 3 hetero atoms each of which is selected from nitrogen, oxygen and sulfur, at least one hetero atom being nitrogen, which ring is unsubstituted or substituted by 1 or 2 $C_{1-4}$alkyl groups, each of $R_4$ and $R_5$ is independently $C_{1-6}$alkyl; $C_{2-6}$alkyl monosubstituted by hydroxy or cyano; phenyl; phenyl substituted by 1 to 3 substituents selected from chloro, $C_{1-4}$alkyl and $C_{1-4}$alkoxy, phenyl($C_{1-4}$alkyl); phenyl($C_{1-4}$alkyl) the phenyl ring of which is substituted by 1 to 3 substituents selected from chloro, $C_{1-4}$alkyl and $C_{1-4}$alkoxy; $C_{5-6}$cycloalkyl or $C_{5-6}$cycloalkyl substituted by 1 to 3 $C_{1-4}$alkyl groups, or

is a 5- or 6- membered ring containing 1 to 3 hetero atoms each of which is selected from nitrogen, oxygen and sulfur, at least one hetero atom being nitrogen, which ring is unsubstituted or substituted by 1 or 2 $C_{1-4}$alkyl groups, and $R_6$ is $C_{1-4}$alkyl or benzyl, or —N$^\oplus$R$_4$R$_5$R$_6$ is pyridinium or pyridinium substituted by 1 or 2 methyl groups, $R_7$ is hydrogen $C_{1-6}$alkyl or $C_{1-6}$alkyl monosubstituted by hydroxy, cyano, chloro or phenyl, $R_8$ is $C_{1-6}$alkyl or $C_{1-6}$alkyl monosubstituted by hydroxy, cyano, chloro p is 0 to 3, and An$^\ominus$ is a non-chromophoric anion.

4. A compound according to claim 3, or an internal or external salt thereof, wherein each Z is independently —NR$_{1b}$—(Q$_{2b}$—NR$_{1b}$)$_{p'}$—Q$_{1a}$—NR$_{2b}$R$_{3b}$, —NR$_{1b}$—(Q$_{2b}$—NR$_{1b}$)$_{p'}$—Q$_{1a}$—N$^\oplus$R$_{4b}$R$_{5b}$R$_{6a}$ An$^\ominus$,

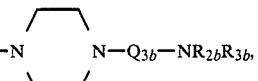

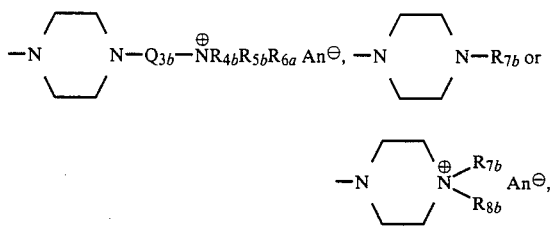

wherein
Q$_{1a}$ is linear or branched C$_{2-6}$alkylene; linear or branched C$_{3-4}$-alkylene monosubstituted by hydroxy; —(CH$_2$)$_t$—1,3-phenylene; —(CH$_2$)$_t$—1,4-phenylene; 1,3-phenylene; 1,4-phenylene or *—NHCO—CH$_2$—,
wherein
t is 1 to 4, and
the * denotes the atom attached to the —NR$_{1b}$— radical,
each of Q$_{2b}$ and Q$_{3b}$ is linear C$_{2-6}$alkylene,
each R$_{1b}$ is independently hydrogen, methyl or 2-hydroxyethyl,
each of R$_{2b}$ and R$_{3b}$ is independently, hydrogen, C$_{1-4}$alkyl or 2-hydroxyethyl, or
—NR$_{2b}$R$_{3b}$ is morpholino, piperidino, piperazino or N'-methylpiperazino,
each of R$_{4b}$ and R$_{5b}$ is independently C$_{1-4}$alkyl or 2-hydroxyethyl, and R$_{6a}$ is methyl, ethyl or benzyl, or
—N$^\oplus$R$_{4b}$R$_{5b}$R$_{6a}$ is pyridinium or methylpyridinium,
R$_{7b}$ is hydrogen, methyl, ethyl or 2-hydroxyethyl,
R$_{8b}$ is methyl, ethyl or 2-hydroxyethyl, and
p' is 0 or 1.

5. A compound according to claim 4, or an internal or external salt thereof,
wherein
each of X$_1$ and X$_3$ is independently chloro; hydroxy; methyl; methoxy; phenyl; phenoxy; amino; C$_{1-4}$alkylamino; N,N-di-(C$_{1-2}$alkyl)amino; C$_{2-4}$hydroxyalkylamino; N,N-di-(C$_{2-4}$hydroxyalkyl)amino; phenylamino; phenylamino the phenyl ring of which is mono-substituted by chloro, methyl or methoxy; piperidino; morpholino; piperazino; N'-methylpiperazino or Z$_a$, and
each of X$_2$ and X$_4$ is independently Z$_a$,
wherein
each Z$_a$ is independently —NR$_{1b}$—(Q$_{2b}$—NR$_{1b}$)$_{p'}$—Q$_{1a}$—NR$_{2b}$R$_{3b}$, —NR$_{1b}$—(Q$_{2b}$—NR$_{1b}$)$_{p'}$—Q$_{1a}$—N$^\oplus$R$_{4b}$R$_{5b}$R$_{6a}$ An$^\ominus$,

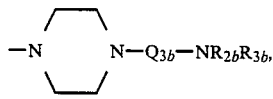

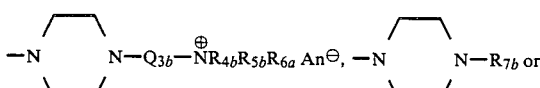

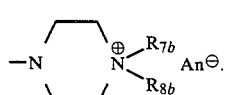

6. A compound according to claim 2, or an internal or external salt thereof, wherein
each R$_1$ is independently hydrogen, methyl or 2-hydroxyethyl.

7. A compound according to claim 2, or an internal or external salt thereof, wherein
one of n$_1$ and n$_2$ is 1 and the other is 0.

8. A compound according to claim 7 having the formula

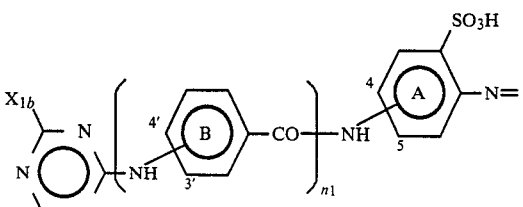

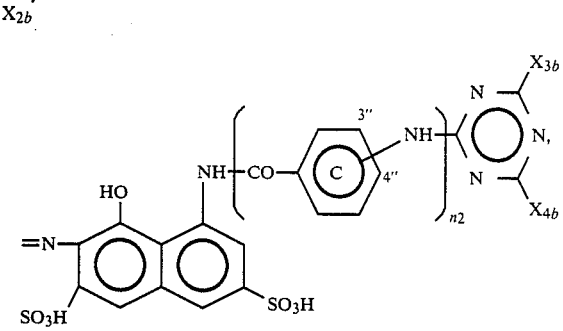

or an internal or external salt thereof,
wherein
each of X$_{1b}$ and X$_{3b}$ is independently chloro, hydroxy, amino, C$_{1-2}$alkylamino, C$_{2-4}$-hydroxyalkylamino, N,N-di-(C$_{2-4}$hydroxyalkyl)amino or Z$_b$,
each of X$_{2b}$ and X$_{4b}$ is independently Z$_b$, and
one of n$_1$ and n$_2$ is 1 and the other is 0,
wherein each Z$_b$ is independently —NH—Q$_{1b}$—NR$_{2b}$R$_{3b}$, —NH—Q$_{1b}$—N$^\oplus$R$_{4b}$R$_{5b}$R$_{6b}$ An$^\ominus$,

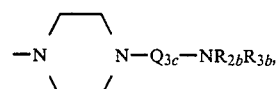

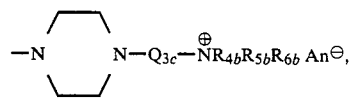

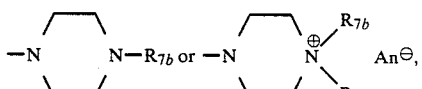

wherein
Q$_{1b}$ is linear or branched C$_{2-6}$alkylene,
Q$_{3c}$ is ethylene or 1,3-propylene,
each of R$_{2b}$ and R$_{3b}$ is independently hydrogen, C$_{1-4}$alkyl or 2-hydroxyethyl, or
—NR$_{2b}$R$_{3b}$ is morpholino, piperidino, piperazino or N'-methylpiperazino,
each of R$_{4b}$ and R$_{5b}$ is independently C$_{1-4}$alkyl or 2-hydroxyethyl, and R$_{6b}$ is methyl, or
—N$^\oplus$R$_{4b}$R$_{5b}$R$_{6b}$ is pyridinium or methylpyridinium, $R_{7b}$ is hydrogen, methyl, ethyl or 2-hydroxyethyl,
$R_{8b}$ is methyl, ethyl or 2-hydroxyethyl, and
$An^{\ominus}$ is a non-chromophoric anion, with the provisos that (1) the —NH— radical attached to Ring A is in the 4- or 5-position thereof, (2) when $n_1$ is 1, the —NH— radical attached to Ring B is in the 3'- or 4'-position, and (3) when $n_2$ is 1, the —NH— radical attached to Ring C is in the 3''- or 4''-position thereof.

9. A compound according to claim 8, or an internal or external salt thereof, wherein each of $X_{1b}$, $X_{2b}$, $X_{3b}$ and $X_{4b}$ is independently —NH—$Q_{1c}$—$NR_{2c}R_{3c}$,

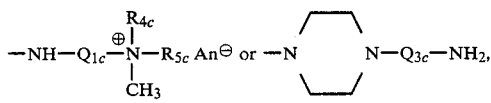

wherein
each of $Q_{1c}$ and $Q_{3c}$ is ethylene or 1,3-propylene,
each of $R_{2c}$ and $R_{3c}$ is independently hydrogen, methyl or ethyl,
each of $R_{4c}$ and $R_{5c}$ is independently methyl or ethyl, and
$An^{\ominus}$ is a non-chromophoric anion.

10. A compound according to claim 9, or an internal or external salt thereof,
wherein
$n_1$ is 0, and
$n_2$ is 1.

11. A compound according to claim 10, or an internal or external salt thereof,
wherein
the —NH— radical attached to Ring A is in the 4-position thereof, and
the —NH— radical attached to Ring C is in the 3''-position thereof.

12. The compound according to claim 11, or an acid addition salt thereof, wherein
each of $X_{1b}$, $X_{2b}$, $X_{3b}$ and $X_{4b}$ is 3-(N,N-diethylamino)propylamino.

13. The compound according to claim 11, or an acid addition salt thereof, wherein
each of $X_{1b}$, $X_{2b}$, $X_{3b}$ and $X_{4b}$ is 3-(N,N-dimethylamino)propylamino.

14. The compound according to claim 8, or an acid addition salt thereof,
wherein
each of $X_{1b}$, $X_{2b}$, $X_{3b}$ and $X_{4b}$ is 3-(N,N-diethylamino)propylamino,
$n_1$ is 1,
$n_2$ is 0,
the —NH— radical attached to Ring A is in the 4-position thereof, and
the —NH— radical attached to Ring B is in the 4'-position thereof.

15. The compound according to claim 8, or an acid addition salt thereof,
wherein
each of $X_{1b}$, $X_{2b}$, $X_{3b}$ and $X_{4b}$ is 3-(N,N-diethylamino)propylamino,
$n_1$ is 1,
$n_2$ is 0,
the —NH— radical attached to Ring A is in the 4-position thereof, and
the —NH— radical attached to Ring B is in the 3'-position thereof.

16. The compound according to claim 1 having the formula

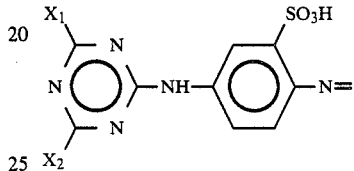

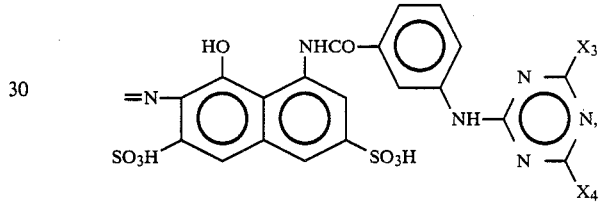

or an acid addition salt thereof,
wherein
each of $X_1$ and $X_2$ is 2-aminopropylamino, and
each of $X_3$ and $X_4$ is 3-(N,N-diethylamino)-propylamino.

17. A dye mixture consisting of
(a) a compound according to claim 1, an internal or external salt thereof or a mixture of such compounds or salts, and
(b) a copper phthalocyanine dye containing basic groups, cationic groups or both basic and cationic groups, or a mixture thereof.

18. A compound according to claim 10, or an internal or external salt thereof,
wherein $X_{1b}$, $X_{2b}$, $X_{3b}$ and $X_{4b}$ are identical.

19. A storage-stable, liquid aqueous dyeing preparation containing a compound according to claim 1, in water-soluble salt form.

* * * * *